United States Patent [19]
Klein

[11] 3,750,145
[45] July 31, 1973

[54] LINEAR TIME DISPERSIVE CHANNEL DECODER

[75] Inventor: Theodore J. Klein, Monmouth, N.J.

[73] Assignee: The United States of America as represented by the Secretary of the Army, Washington, D.C.

[22] Filed: June 22, 1971

[21] Appl. No.: 155,423

[52] U.S. Cl. ................ 340/347 DD, 325/42, 333/18
[51] Int. Cl. ................ G06f 3/04
[58] Field of Search ................ 325/42, 65; 178/69 R; 328/155; 333/18; 340/347 DD, 347 DA

[56] References Cited

UNITED STATES PATENTS

| | | | |
|---|---|---|---|
| 3,297,951 | 1/1967 | Blasbalg | 340/146.3 C |
| 3,621,221 | 11/1971 | Cann | 333/18 |
| 3,571,733 | 3/1971 | Fang | 325/42 |
| 3,597,541 | 8/1971 | Proakis | 325/42 |
| 3,537,038 | 10/1970 | Rich | 325/42 |
| 3,596,267 | 7/1971 | Goodman | 235/154 |

*Primary Examiner*—Maynard R. Wilbur
*Assistant Examiner*—Jeremiah Glassman
*Attorney*—Harry M. Saragovitz et al.

[57] ABSTRACT

The channel decoder provides equalization of a linear time dispersed digital signal having groups of $k$ bits dispersed over $n$ bauds. The dispersed signal is sampled n times, once for each baud. The n samples are each stored in one register of a set of $n$. The n registers each contain $k$ stages having an amplifier connected to the output of each stage to form an array of gain producing elements with positive, negative or zero gains. A set of $k$ summing circuits sum the amplifier outputs in groups of $n$, one group for each of the $k$ stages. The outputs of the summing circuits are gated onto an output line by a clock.

7 Claims, 5 Drawing Figures

INVENTOR,
THEODORE J. KLEIN
BY Jeremiah J. Murray AGENT
Harry M. Saragovitz
Edward J. Kelly
Herbert Berl
ATTORNEYS

INVENTOR.
THEODORE J. KLEIN

BY Harry M. Saragovitz AGENT
Edward J. Kelly
Herbert Berl ATTORNEYS

LINEAR TIME DISPERSIVE CHANNEL DECODER

The present invention relates to digital data transmission systems and more particularly to a linear time dispersive channel decoder.

Those concerned with the development of data transmission systems have long recognized the need for a simple but more effective device which reduces substantially or even eliminates intersymbol interference. For example, in digital communication systems a substantial amount of overlap distortion of the digital pulses is caused by the time dispersive characteristics of the transmission channel. It has been the general practice to reduce such distortion at the receiver with a tapped delay line equalizer which employs a tapped delay line, a series of variable gain elements and a summing circuit for providing equalization. Theoretically, such devices can approach total equalization of the distorted signal only as the number of taps approaches infinity.

The general purpose of this invention is to provide an equalizer which is capable of total equalization of signals distorted by a linear time dispersive transmission channel with only a finite number of taps or the equivalent thereof. The equalization technique employed by the present invention views the intersymbol interference as an encoding of the digital signal during the transmission. Once the encoding characteristics of the transmission channel are known, the device of the present invention uses this information to simply decode the transmitted signal by performing a unique linear transformation of the encoded signal.

With these and other objects in view as will hereinafter more fully appear and which will be more particularly pointed out in the appended claims, reference is now made to the following description taken in connection with the accompanying drawings in which:

Figure 1:
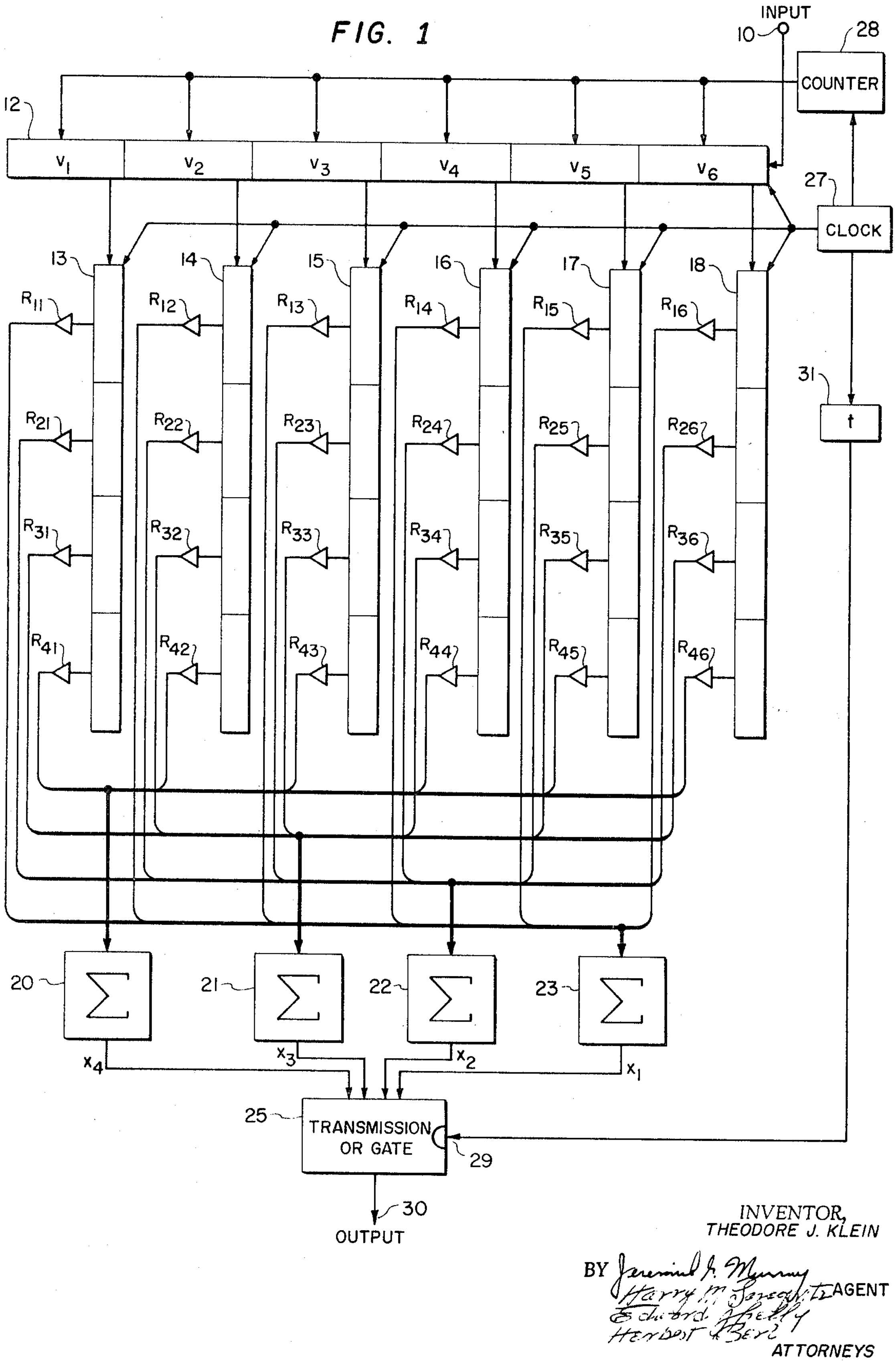
FIG. 1 shows a schematic drawing of a preferred embodiment of the invention.

Referring now to the drawings, there is shown in FIG. 1 the channel decoder having an input terminal 10, a six-stage register 12, six four-stage shift registers 13–18 and a matrix of decode amplifiers $R_{11}$ to $R_{46}$, the subscripts of which determine the matrix row and column position of each of the amplifiers. It is pointed out that the specific number of stages, six and four, are used only for illustration. Also included are four summing circuits 20–23, the outputs of which are connected to the input of a transmission OR gate 25. Controlling the shift registers 12–18 is a clock 27 and a counter 28. The output of clock 27 is also applied to an enabling terminal 29 of gate 25 via a time delay 31 having a delay equal to one-half the clock period. A digital signal received at the terminal 10 is applied to the input of the first stage of shift register 12 where the instantaneous voltage value thereof is sampled and stored in the first stage in phase with the clock 27 output. With the reception at register 12 of each clock pulse from clock 27, the voltage value which was last stored in the first stage is shifted to the second stage while the next instantaneous voltage value on terminal 10 is stored in the first stage. This process continues until the register

12 is full (six instantaneous samples), at which time an output pulse is produced by counter 28 and applied to each of the six stages of the register 12. At this time the voltage values stored in the six stages of register 12 are shifted out in parallel to the first stage of each of the registers 13–18 and again an instantaneous voltage value is stored in the first stage of register 12.

Each of the amplifiers $R_{11}$ to $R_{46}$ has a preset gain, either positive, negative or zero. The output of a particular amplifier would then be equal to the voltage value stored in the associated register stage times the gain of the amplifier. For example, assume that the reference characters of the amplifiers $R_{11}$ to $R_{46}$ also designate the gain, then the output of amplifier $R_{11}$ would be equal to the voltage value stored in the first stage of register 13, say $v_1$ volts, times the gain, $R_{11}$, i.e. $(v_1 R_{11})$ volts. When no specific voltage value is stored in a particular stage, then it is assumed that a value of zero volts is stored therein and the associated amplifier output will be zero volts.

The outputs of all amplifiers in a given row are summed in one of the summing circuits 20–23 and are then transmitted to the output terminal 30 via OR gate 25 at the delayed clock rate of clock 27.

It should now be evident that the device of FIG. 1 basically performs a matrix multiplication between a six dimensional vector, the components of which consist of the six voltage values stored in the register 12, and a 4x6 matrix, the 24 components of which consist of the values of the gains of the amplifiers $R_{11}$ to $R_{46}$. Therefore, for each six input voltage values or pulses applied to terminal 10, say $(v_1, v_2, v_3, v_4, v_5, v_6)$ there will be six output voltages, say $(x_1, x_2, x_3, x_4, x_5, x_6)$ having the following values:

$$x_1 = v_1 R_{11} + v_2 R_{12} + v_3 R_{13} + v_4 R_{14} + v_5 R_{15} + v_6 R_{16},$$
$$x_2 = v_1 R_{21} + v_2 R_{22} + v_3 R_{23} + v_4 R_{24} + v_5 R_{25} + v_6 R_{26},$$
$$x_3 = v_1 R_{31} + v_2 R_{32} + v_3 R_{33} + v_4 R_{34} + v_5 R_{35} + v_6 R_{36},$$
$$x_4 = v_1 R_{41} + v_2 R_{42} + v_3 R_{43} + v_4 R_{44} + v_5 R_{45} + v_6 R_{46},$$
$$x_5 = 0,$$
$$x_6 = 0$$

Since the values of $x_5$ and $x_6$ are always zero in the present example, the output voltages $x$ are completely defined by a four dimensional vector having the four components $(x_1, x_2, x_3, x_4)$. In practice, the zero components $x_5$ and $x_6$ may be simply eliminated by adding a retiming circuit which simply reads out the four outputs of summers 20–23 for each six clock cycles of clock 27. In the usual matrix notation the above equations may be expressed as follows, $$x = R\,v$$

where:

$x$ is a four component vector,
$R$ is a $4 \times 6$ matrix, and
$v$ is a six component vector.

It will now be demonstrated that, if the values of the gains or the matrix elements $R_{11}$ to $R_{46}$ are specified according to a particular rule, then intersymbol interference due to a linear time dispersion from a given transmission channel can be completely eliminated. Further, there is a unique set of such elements which minimizes noise enhancement as will be later described.

Figure 2:
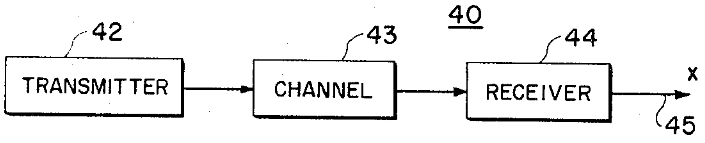
FIG. 2 shows a block diagram of an idealized communication system.

FIG. 2 shows a general communication system 40 having a transmitter 42, a transmission channel 43, a receiver 44, and an output terminal 45. The components in system 40 may have associated therewith linear transformations which express the linear time dispersive characteristics of each element and define functional relationships between each set of input signals and the associated set of output signals for each element. For purposes of the present discussion, the symbols C and R will be used to represent the associated linear transformation of the channel 43, and the receiver 44, respectively.

Figure 3:
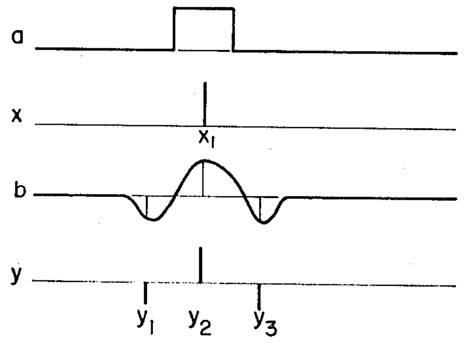
FIGS. 3 and 4 show waveforms helpful in explaining the theory of operation.

For example, with reference to FIG. 3, assume that the signal $a$, which is a single square pulse, is transmitted by transmitter 42. Also, let it be assumed that because of the time dispersive characteristics of the channel 43, the signal $b$ is received by the receiver 44 in response to the transmission of signal $a$. Because the information is digital, but not necessarily binary, signals $a$ and $b$ can be completely specified by the voltage samples $x$ and $y$ respectively. Further, if the voltage values $x$ and $y$ are considered to be the components of a vector and the letter C is also used to signify a matrix which represents the linear transformation C, then the following matrix equation $$C x = y$$

completely describes the transformation of the signal $a$ into the signal $b$ due to the time dispersive characteristics of the channel 43. In the above equation, and for the example shown in FIG. 3, $x$ is a one dimensional vector and $y$ is a three dimensional vector having the components $(x_1)$ and $(y_1, y_2, y_3)$ respectively. The vector dimension of y would change for a system which dispersed the pulse x over more or less bauds.

Also, if in the same system 40, information was transmitted in groups of 4 bits, rather than one, then the dimension of the vector $x$ would change and the order of the matrix C would change accordingly.

Figure 4:
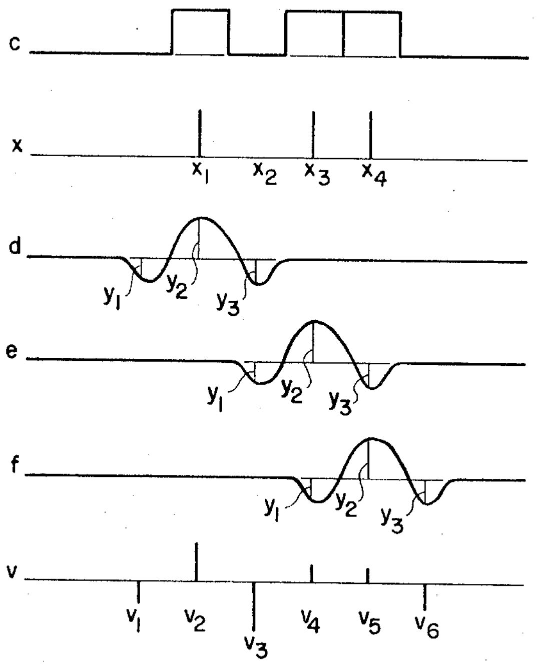

FIG. 4 shows the transformation of a signal $c$, which may represent the 4 binary bits 1011, into a signal (not shown) but which is equal to the sum of the signals $d$, $e$ and $f$, because of the linearity of the channel 43. The signal $c$ may be completely defined by the four voltage samples $(x_1, x_2, x_3, x_4)$, where $x_2$ is equal to zero. Likewise, the output signal, which is the sum of signals $d$, $e$ and $f$, can be completely defined by the voltage samples $(v_1, v_2, v_3, v_4, v_5, v_6)$ which are the sums or superpositions of the component voltages $(y_1, y_2, y_3)$ of each of the component signals $d$, $e$ and $f$.

The above explanation pertaining to the linear time dispersive characteristics of the channel 43 has followed the classical approach. Another way of looking at the above phenomenon is to consider that the channel 43 is an encoder and actually encodes the transmitted signals. For example, the signal $a$ in FIG. 3 may be considered to be the binary signal 1 which was encoded into a digital signal $y$ (not binary) by the channel 43. Likewise, the binary signal $c$ of FIG. 4 was encoded from the 4 bit signal 1011 into the six bit digital (not binary) signal $v$ of FIG. 4. The signal $v$ may be decoded by providing at the receiver 44 a decoder of the type shown in FIG. 1 and by choosing the values of the gains $R_{11} - R_{46}$ in a manner to be now described.

In order to obtain the transmitted signal x at the output 45, it is necessary that the received signal $v$ be transformed back into vector $x$ by the receiver 44. To accomplish this, it is necessary that the combined linear transformation of the channel 43 and receiver 44 be equal to the identity transformation, i.e.

$$R C = I$$

where $I$ is the identity transformation. It can be readily shown by well established theorems of Linear Algebra that if $C$ is an $n \times k$ matrix of rank $k$, where $n$ is greater than $k$, there exists a $k \times n$ matrix $R$ such that $$R C = I$$

where $I$ is a $k \times k$ identity matrix.

The elements of the matrix C can be easily measured and the matrix C constructed by observing test signals sent over the transmission channel 43. For example, assume that because of the linear time dispersive characteristics of channel 43, the single square pulse $a$ is dispersed over three bauds into the signal $b$. If it is assumed further that signal $a$ is a test signal of one unit, e.g., 1 volt or 1 millivolt, etc., then the matrix C will be made up of elements equal to the vector components $y_1$, $y_2$ and $y_3$. Therefore, for the case where groups of four binary pulses are to be transmitted as exemplified in FIG. 4, the linear transformation C of the channel 43 will be the following 4 × 6 matrix:

$$C = \begin{bmatrix} y_1 & 0 & 0 & 0 \\ y_2 & y_1 & 0 & 0 \\ y_3 & y_2 & y_1 & 0 \\ 0 & y_3 & y_2 & y_1 \\ 0 & 0 & y_3 & y_2 \\ 0 & 0 & 0 & y_3 \end{bmatrix}$$

In general, if the information signal $c$ is transmitted in groups of $k$ bits and the channel disperses this signal over $n$ bauds, the matrix C will be of order $n \times k$. To demonstrate that the above matrix C will transform the vector $x = (1, 0, 1, 1)$ into the vector v shown in FIG. 4, the following calculation is shown:

$$Cx = \begin{bmatrix} y_1 & 0 & 0 & 0 \\ y_2 & y_1 & 0 & 0 \\ y_3 & y_2 & y_1 & 0 \\ 0 & y_3 & y_2 & y_1 \\ 0 & 0 & y_3 & y_2 \\ 0 & 0 & 0 & y_3 \end{bmatrix} \begin{bmatrix} 1 \\ 0 \\ 1 \\ 1 \end{bmatrix} = \begin{bmatrix} y_1 \\ y_2 \\ y_3+y_1 \\ y_2+y_1 \\ y_3+y_2 \\ y_3 \end{bmatrix} = \begin{bmatrix} v_1 \\ v_2 \\ v_3 \\ v_4 \\ v_5 \\ v_6 \end{bmatrix}$$

where:

$v_1 = y_1$, $v_2 = y_2$, $v_3 = y_3 + y_1$, $v_4 = y_2 + y_1$, $v_5 = y_3 + y_2$, $v_6 = y_3$ .

Since the linear transformation or matrix C is known, linear transformations or matrices may be obviously constructed for R which satisfy the following equation:

$$RC = I .$$

Of course, if $C$ is an $n \times k$ matrix, then $R$ must be a $k \times n$ matrix to make the $k \times k$ identity matrix I dimensionally correct.

Therefore, to summarize, it has been shown that in general, if groups of $k$ digital bits are time dispersed over $n$ bauds by a known linear time dispersive channel, then a channel decoder, such as shown in FIG. 1, can be constructed which will perform a decoding linear transformation on the dispersed or encoded signal $v$, thereby removing completely the intersymbol interference. The values of the matrix elements which make up the decoding linear transformation $R$ must be chosen such that the following expression is satisfied, $$RC = I\,.$$

It is noted that the transmitter must transmit in groups of k bits and then not transmit or transmit zeros for $n - k$ bauds after which another group of $k$ bits may be transmitted.

For the device shown in FIG. 1, the values of the gains $R_{11} - R_{46}$ will be set equal to the values of the corresponding elements of the matrix R.

An example of an actual construction of a particular matrix R will now be given. Partition the matrix C into three submatrices $C_1$, $C_2$, $C_3$ as follows:

$$C = \begin{bmatrix} C_1 \\ C_2 \\ C_3 \end{bmatrix}$$

where:
$C_1$ is $m \times k$,
$C_2$ is $k \times k$,
$C_3$ is $n - k - m \times k$, and
$m$ is greater than or equal to zero and less than or equal to $n - k$. Partition $R$ as follows:

$$R = [R_1\ R_2\ R_3]$$

where:
$R_1$ is $k \times m$,
$R_2$ is $k \times k$,
$R_3$ is $k \times n - k - m$.
Set $R_1$ and $R_3$ equal to 0 and $R_2$ equal to $C_2^{-1}$ so that:

$$RC = R_2C_2 = C_2^{-1}C_2 = I$$

Therefore, as just demonstrated, one choice of the elements of the matrix $R$ is:

$$R = [R_1\ R_2\ R_3] = [0\ C_2^{-1}\ 0]$$

where $C_2^{-1}$ is a $k \times k$ matrix defined as above. Since matric C is completely determined, the matrix elements of R are completely determined. In general, there is more than one value of m for which $C_2^{-1}$ exists. Therefore, other examples could be easily constructed. Although all such solutions for R have the property of eliminating intersymbol interference, they all have different effects on additive noise.

Figure 5:
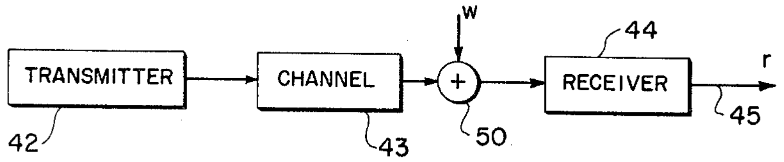
FIG. 5 shows a block diagram of a realistic communication system.

The system 40, shown in FIG. 2, is idealized and did not show any additive noise. However, most real systems are more realistically approximated by the system shown in FIG. 5, which includes all of the same elements of the system of FIG. 2 plus an element 50 which symbolizes the addition of noise during transmission.

The input signal v to the receiver 44 may now be expressed by the following equation:

$$v = Cx + w$$

where $Cx$ is the same time dispersed signal as above and $w$ is an $n$-component vector which represents the addition of noise by element 50. In this case, the receiver 44 will no longer transform $v$ into $x$, but will have an output signal $r$ given by the following expressions:

$$r = Rv = R\,(Cx + w) = RCx + Rw = x + Rw.$$

Therefore, the amount of noise present in the output signal $r$ of the receiver 44 will now depend on the form of the matrix $R$, since the output signal $r$ is equal to the transmitted signal $x$ plus the noise $Rw$.

It will now be shown that in minimizing the noise, i.e., the term $Rw$, there results a unique solution for the matrix $R$.

The $j$th element of the vector $r$ is $$r_j = \sum_{i=1}^{n} R_{ji} v_i, \qquad j = 1, 2, \ldots k$$

where $R_{ji}$ is the element in the $j$th row and ith column of $R$. The output noise variance $N_o$ is obtained by assuming a zero signal $x$. Therefore, $$N_{oj} = E\left[\left(\sum_{i=1}^{n} R_{ji} w_i\right)^2\right] = N \sum_{i=1}^{n} R_{ji}^2, \qquad j = 1, 2, \ldots k$$

where $N_{oj}$ is the jth component of the output noise variance, $N$ is the input noise variance, which is a scalar independent of $j$, and $E$ symbolizes the mathematical expectation. If $R_j$ is the jth row of the matrix $R$, the following constraint must be satisfied:

$$R_jC = I_j, \qquad j = 1, 2, \ldots k$$

where the row matrix $I_j$ contains all zeros except for a one in the $j$th position. The minimization of $N_{oj}$ subject to the above constraint may now be carried out with the use of Lagrange multipliers $L$. The Lagrange function $F$ may be written as follows:

$$F(R_j, L_j) = \frac{1}{2} \sum_{i=1}^{n} R_{ji}^2 + \sum_{K=1}^{k} L_{jK}\left[I_{jK} - \sum_{N=1}^{n} R_{jN} C_{NK}\right],$$

where the elements of $L_j$ are the set of k Lagrange multipliers, and $I_{JK}$ is the corresponding element of a $k \times k$ identity matrix I. It can be readily shown that minimization of $F(R_j, L_j)$ with respect to $R_{ji}$ and $L_{JK}$ yields the following expression:

$$R_j = I_j\,(C^TC)^{-1}\,C^T, \qquad j = 1, 2, \ldots k.$$

The general solution for the matrix $R$ which minimizes the noise enhancement can be expressed as a function of the already known matrix $C$ for the channel 43 as follows:

$$R = (C^TC)^{-1}\,C^T.$$

Of course, the above expression for R satisfies the condition that the intersymbol interference be eliminated, as can be seen by post multiplying each side by $C$, i.e.

$$RC = (C^TC)^{-1}\,(C^TC) = I.$$

Therefore, if the gains $R_{11}$ - $R_{46}$ are set equal to the corresponding values of the elements of the matrix $$R = (C^TC)^{-1}\,C^T,$$

then the intersymbol interference due to the linear time dispersion of the channel 43 will be eliminated and the noise enhancement will be minimized.

It should be obvious that devices having configurations other than that shown in FIG. 1 can accomplish the same results. For example, instead of maintaining the gains $R_{11}$ – $R_{46}$ constant and stepping the voltage samples $v_1$ – $v_6$ along the successive stages of the registers 13–18, as is shown in FIG. 1, a device could be constructed having only one row of amplifiers, say $R_{11}$, $R_{12}$, $R_{13}$, $R_{14}$, $R_{15}$ and $R_{16}$, each having a variable gain, plus a logic means for varying the gains $R_{11}$ – $R_{16}$ in four discrete steps in accordance with the values of the elements of the matrix R to form the four output voltages $x_1$, $x_2$, $x_3$ and $x_4$.

The configuration shown in FIG. 1 is preferred because each of the registers 13–18 and the associated amplifiers $R_{11}$ – $R_{46}$ are basically configured like the standard tapped delay line equalizers referred to earlier. A discussion of the basic tapped delay line equalizer can be found in the article "Automatic Equalization for Digital Communication," B. S. T. J. 44, Apr. 1965. Most of the refinements which have been made to the standard typical delay line equalizers are also applicable to the device shown in FIG. 1. For example, because the dispersion characteristics of the channel may vary with time, standard equalizers include means for varying the gains accordingly. These same gain varying principles may also be applied to the equalizer of the present invention.

Obviously many modifications and variations of the present invention are possible in the light of the above teachings. It is therefore to be understood, that within the scope of the appended claims, the invention may be practiced otherwise than as specifically described.

What is claimed is:

1. A channel decoder for equalizing a $k$-bit digital signal dispersed over $n$ bauds according to a linear transformation matrix C where $k$ and $n$ are integers and $n$ is greater than $k$ comprising:

means for sampling said signal once during each said baud;

$n$ storage means each for storing one of said samples;

$n$ gain means each having $k$ different gains and each connected to a different one of said storage means for providing $k$ spaced output signals which are functions of said $k$ gains and the value of said stored samples;

said $k$ spaced output signals being related to said $n$ stored samples by a linear transformation matrix R to form an overall linear transformation matrix RC;

said overall linear transformation matrix RC equal to the identity transformation matrix;

$k$ summing means each connected at the input to a different one of the outputs of each said $n$ gain means for combining in each said summing means a different one of said $k$ output signals from each said n gain means; and transmission means having $k$ input terminals, connected to the outputs of said $k$ summing means, and an output means for transmitting successively the outputs of said summing means.

2. A channel decoder according to claim 1 wherein the values of said k gains of said n gain means form said linear transformation matrix R.

3. A channel decoder according to claim 2 wherein said linear transformation matrices $R$ and $C$ are related according to the following expression:

$$R = (C^TC)^{-1}\,C^T.$$

4. A channel decoder according to claim 2 wherein each said $n$ storage means comprises a delay means having $k$ storage stages for storing said one of said samples in a different one of said stages over $k$ successive time periods; and each said n gain means having $k$ gain stages each connected to the output of one of said $k$ delay stages.

5. A channel decoder according to claim 4 wherein said linear transformation matrices R and C are related according to the following expression:

$$R = (C^TC)^{-1}\,C^T.$$

6. A channel decoder for equalizing a $k$-bit digital signal dispersed over $n$ bauds according to a linear transformation matrix C where $k$ and $n$ are integers and $n$ is greater than $k$ comprising:

means for sampling said signal once during each said baud;

storage means for storing a set of $n$ successive samples;

gain means connected to said storage means for providing a set of nxk gains to form a linear transformation matrix R;

timing means for combining said n samples and said $n \times k$ gains according to the rules of matrix multiplication to produce a set of $k$ successive output signals; and the values of said $n \times k$ gains related such that the overall transformation matrix RC is equal to the identity transformation matrix.

7. A channel decoder according to claim 6 and wherein said linear transformation matrices R and C are related according to the following expression:

$$R = (C^TC)^{-1}\,C^T.$$

* * * * *